3,694,394
COATING COMPOSITIONS
Maurice Freeman, Welwyn Garden City, England, assignor to Imperial Chemical Industries Limited, London, England
No Drawing. Filed Apr. 4, 1969, Ser. No. 813,738
Claims priority, application Great Britain, Apr. 16, 1968, 17,894/68
Int. Cl. C08d 7/00; C08f 15/40, 37/18
U.S. Cl. 260—29.7 W
8 Claims

ABSTRACT OF THE DISCLOSURE

Aqueous coating compositions comprising blends of latices, one insoluble in aqueous alkali and the other substantially swellable in said alkali.

---

The present invention relates to aqueous coating compositions particularly to those for coating permeable substrates e.g. paper and board.

It is normal practice to coat paper and board with an aqueous dispersion of a pigment together with a pigment binder. In the past, casein and starch have been used as the conventional pigment binders, but for many years now film-forming organic polymers have been used in combination with casein or starch as the pigment binder. Because of the thermoplastic nature of the organic polymer it would be possible to obtain a coating having an improved appearance if the binder consisted solely of the organic polymer. This has so far not been found possible because in admixture with pigment the conventional organic polymers that have been used do not give a coating composition having a sufficiently good water retention or a high enough viscosity, when used as the sole binder.

It is an object of this invention to provide a coating composition in which the film-forming ingredient is a synthetic organic polymer, and from which the conventional pigment binders such as starch and casein may be omitted.

Accordingly, the present invention comprises an aqueous coating composition comprising a blend of a latex of a copolymer A and a latex of a copolymer B in which of the total weight of copolymer A plus copolymer B there is from 80–99% by weight of copolymer A and correspondingly from 1–20% by weight of copolymer B, copolymer A being a film-forming polymer that is insoluble and not swellable to any substantial extent in aqueous alkali at pH 10 at 20° C. and being a copolymer of 45–70% by weight of styrene and/or methyl methacrylate, 0–5% by weight of a copolymerisable ethylenically unsaturated carboxylic acid and the remainder butadiene-1,3, and copolymer B being substantially swellable and at least 50% by weight insoluble in aqueous alkali at pH 10 at 20° C. and being a cross-linked copolymer of 10–45% by weight of butadiene-1,3, 5–45%, preferably 10–45% by weight of styrene and/or methyl methacrylate, and 41–65% by weight of a copolymerisable ethylenically unsaturated acid, the cross-linking being sufficient to impart the required insolubility in aqueous alkali but not so great as to hinder the swelling of the copolymer in aqueous alkali.

The present invention is also directed to the coating composition hereinbefore described and a pigment dispersed therein. In the composition there is preferably from 5–25 parts by weight of copolymer A plus copolymer B to each 100 parts by weight of pigment. The invention is still further directed to a permeable substrate coated with said coating composition and pigment dispersed therein.

In both a paper coating composition, and the copolymer latex to be used as the pigment binder, it is desirable that the viscosity should remain low up to the stage of preparing the pigmented composition, because this facilitates the handling and transport of the materials. Preferably the initial viscosity should be below about 200 cps. It is also preferred that the viscosity of the copolymer latex should remain low at a pH of about 7 because at this pH the latices are more stable for handling and transport. In the application of the coating composition to the substrate the viscosity should thereafter be increased so that the correct coating properties are acquired.

Many soluble thickening agents are known which can impart the required viscosity to a coating mix (e.g. sodium or ammonium salts of polyacrylic acid and its copolymers) but if these are incorporated with the latex of a copolymer intended for use as a pigment binder, the viscosity of the latex is increased to the point where it becomes impossible to handle even at pH values below 7.

Dispersions of alkali soluble copolymers, e.g. commercially available polyacrylic acid copolymers, which are of low viscosity at pH 3 increase rapidly in viscosity as the pH is raised to 6 or 7, making them unsuitable for modifying the viscosity properties of ordinary paper coating latices.

The copolymers B of the coating composition of this invention, being largely alkali insoluble, do not materially affect the viscosity of the copolymer blend or the coating mix until a pH of over 7 is reached by the addition of an alkali, preferably aqueous ammonium hydroxide. Thus in these coating compositions the attainment of the required viscosity for coating purposes is achieved simply by the addition of alkali, thus making possible the economic use of butadiene copolymers as the sole binder for the pigment.

The coating composition of this invention comprises a blend of a latex of copolymer A and a latex of copolymer B, and an advantageous method of producing these latices is by the well known process of emulsion polymerisation. In this process the mixture of monomeric materials is polymerised while dispersed in a continuous aqueous phase containing a dissolved emulsifying agent. In conventional emulsion polymerisation processes from 1.5–5% by weight of emulsifying agent is normally present based on the weight of the monomer mixture, but it is advantageous, particularly in the case of copolymer A which forms the major part of the copolymer blend, that there should be less than 1% by weight of the emulsifying agent based on the weight of monomer mixture, because this leads to improved water resistance in the finished coating, and also a low degree of foaming during the use of the coating composition i.e. in mixing and the application of the composition to the substrate. In the emulsion polymerisation a catalyst is also normally used which can be a water soluble catalyst e.g. potassium and ammonium persulphate or it can be a redox catalyst which is, for example, a combination of an organic peroxide and a reducing agent.

It is also normal practice in carrying out an emulsion polymerisation process to include a polymerisation modifying agent which is normally a mercaptan to control the molecular weight of the polymer. Also where one of the monomeric components of the polymerisation recipe is a carboxylic acid, it is necessary to polymerise at a pH of less than 7, normally at a pH of about 2 to 3.

The carboxylic acid content of copolymer A when present can be derived from ethylenically unsaturated carboxylic acid that is copolymerisable with the other monomeric components of the copolymer. Examples of such copolymerisable carboxylic acids are acrylic acid, methacrylic acid, maleic acid, fumaric acid, itaconic acid and citraconic acid. In the case of the dicarboxylic acids it is also possible to use the monoesters of these acids. The presence of the carboxylic acid in copolymer A will tend to cause the copolymer to be swellable with alkali but the effect is not substantial as compared with that of copolymer B. This property can be modified by altering the molecular weight of the copolymer e.g. the swellability in alkali is reduced by increasing the molecular weight. Copolymer A can be, in fact, a conventional paper coating organic polymer latex. It is preferred that copolymer A should form from 88–97% by weight of a blend of copolymer A and copolymer B.

In copolymer B it is preferred that the acid component should form not more than 60% by weight and, more preferably, from 45–50% by weight of the copolymer because above 50% the polymerisation can become difficult to control and, also, the acid component is normally more expensive than the other components of the copolymer. The amount of copolymer B required to give the desired effect in respect of water retention and viscosity in the coating composition, depends, inter alia, upon its acid content. Also copolymer B has little binding effect upon the pigment so that it is desirable from this point of view to maintain the concentration of copolymer B to a minimum. Therefore in order to obtain the most efficient use of copolymer B it is preferred that it should contain not less than 45% of the acid component.

Copolymer B can be derived from any ethylenically unsaturated carboxylic acid provided it is copolymerisable with the other monomeric components of the copolymer. Monoethylenically unsaturated carboxylic acids copolymerise easily with butadiene and styrene and/or methyl methacrylate. Dicarboxylic acids, however, polymerise slowly and in general it is less easy to form copolymer B wholly with a dicarboxylic acid than it is with a monocarboxylic acid. Normally, therefore, it is preferred to use a monoethylenically unsaturated carboxylic acid, such as methacrylic or acrylic acid, as the acid component of copolymer B, but since maleic and fumaric acids are cheaper than methacrylic and acrylic acids, a mixture of mono- and dicarboxylic acids may be used. There is also an advantage in using dicarboxylic acids where possible because they give a higher degree of carboxylation.

The relatively high alkali-insolubility of copolymer B is achieved by the presence of the cross-linking in the copolymer, and, as stated above, in order to obtain the maximum beneficial effect of copolymer B upon the viscosity and water retention properties of the coating mix it is preferred that the latex particles of copolymer B should not be so tightly cross-linked as to hinder the swelling of the particle in alkaline conditions, nor that the molecular weight should be low with so little cross-linking that the copolymer is largely soluble in aqueous alkali. The molecular weight and degree of cross-linking can be controlled by the amount of polymerisation modifier e.g. a mercaptan that is used during the preparation of the copolymer.

The pigments that are used in preparing the pigmented coating compositions are the normal finely divided pigments that are used by the paper coating industry. These are normally mineral pigments and examples include china clay, titanium dioxide, satin white, blanc fixe and calcium carbonate.

Although the coating compositions of this invention are provided for the purpose of coating permeable substrates without the presence of such conventional pigment binders as casein and starch, small amounts of these conventional materials may be included even although it will be realised that the full benefit of the present invention may not thereby be obtained.

The pigmented compositions of this invention are prepared in the normal manner as carried out in the paper coating industry, as also is the application of the coating compositions to permeable substrates.

The ratio of copolymer A to copolymer B required in a paper coating composition will be governed by the total percentage of pigment binder (A+B) present in the composition. For coated gravure quality printing papers, because of the low tack of the ink, a low level of pigment binder i.e. 8–10% on pigment will be sufficient for satisfactory printability, but for coated offset-litho printing papers, a higher level of pigment binder of the order of 14–16% is required as the ink used in this printing process has high tack. To achieve the same application viscosities with coating compositions designed for gravure and offset-litho qualities of coated printing papers, the proportion of copolymer B present in the blend of copolymer A and copolymer B should therefore be higher for the gravure quality than for the offset-litho quality.

Although the principle use for the present invention is as a sole pigment binder in paper coating compositions, there are several other processes in which the present invention may be employed. These include the following:

(a) Filled coating compositions according to the present invention can be applied to the back of a carpet structure or upholstery fabric to anchor the pile to the carrier material and also to impart desired handling properties. The compound may also be used to bond a secondary layer of the carrier material to the back of the carpet structure.

(b) Modification of the viscosity of paints containing styrene/butadiene copolymers.

(c) Adjustment of the viscosity of latex dispersions which are used as impregnants for needle felt carpeting.

(d) Modification of the viscosity of latex dispersions when applied as coatings to films e.g. of cellulose, polyester or polyolefins.

(e) Modification of the viscosity of pigmented leather finishes contataining a film forming organic polymer.

(f) Modification of the viscosity of compound based on pigment and film forming organic polymer used in the production of solid foams.

The invention is illustrated by the following examples in which all parts are expresesd by weight.

EXAMPLE 1

A copolymer, in latex form (Copolymer A), was prepared by adding the following material to a stirred autoclave.

| | Parts |
|---|---|
| Water | 105 |
| Styrene | 47 |
| Itaconic acid | 5 |
| Sodium dodecyl sulphonate | 1.6 |
| A condensation product of nonyl phenol and ethylene oxide (a commercial non-ionic emulsifying agent | 3.0 |
| Potassium persulphate | 0.8 |
| Potassium sulphate | 0.15 |
| Sodium hexametaphosphate | 0.05 |

The autoclave was purged with nitrogen, sealed, evacuated and 48 parts of butadiene-1,3 were fed in.

The dispersion was maintained at 65° C. until substantially all the monomers present had been converted into copolymer giving an acidic latex of about 48% solids content.

This copolymer was found to be insoluble and substantially unswollen when treated with an aqueous solution of ammonium hydroxide.

A copolymer (Copolymer B), in latex form, was prepared at 50° C. in a stirred autoclave from 35 parts butadiene, 17 parts styrene and 48 parts methacrylic acid in the presence of 3 parts of sodium dodecyl benzene sulphonate as emulsifier and 0.2 part of tertiary dodecyl mercaptan, as polymerisation modifier, at 37% monomer content in an aqueous emulsion polymerisation which was taken substantially to completion.

When the resultant acidic latex of milky white appearance was treated with an aqueous solution of ammonium hydroxide at a pH of 9 or above the copolymer did not dissolve to give a clear solution, but formed a translucent suspension of highly swollen jelly-like particles.

A blend was prepared by mixing sufficient of the two latices to give 93 parts of copolymer A with 7 parts of copolymer B and the pH of this latex blend was raised to 6 by the addition of an aqueous solution of ammonium hydroxide without an appreciable increase in viscosity occurring.

This blend was used in preparing the following coating mix.

| | Parts dry weight |
|---|---|
| China clay | 100 |
| "Dispex" 115N (believed to be the sodium salt of a polycarboxylic acid of low molecular weight) | 0.3 |
| Latex blend | 14 |

The china clay was dispersed in water in a high speed mixer in the presence of the "Dispex" 115 N, which acts as a dispersing agent for the china clay, and to the resultant mix was added the latex blend and the solids content adjusted to 60%.

After the pH of the mix had been raised to 9–10 by the addition of an aqueous solution of ammonia, the rheological and water retention properties of the mix were suitable for application to paper using a high speed blade coating machine, whereas a similar coating composition prepared using a latex of Copolymer A alone was too low in viscosity and water retention properties for application on a blade coater.

When applied to paper using a high speed blade coater, dried and calendered, the paper had satisfactory pick resistance for offset litho printing, and high gloss.

EXAMPLE 2

A copolymer (Copolymer A), in latex form, was made by an aqueous emulsion polymerisation at 37% monomer content from 38 parts butadiene, 60 parts methyl methacrylate and 2 parts itaconic acid in the presence of 0.1 part of an emulsifier and 0.05 part of sodium hexametaphosphonate, and subsequently concentrated to about 50% solids content in a "Luwa" thin film evaporator. The polymerisation process was taken to substantial completion.

This copolymer was found to be insoluble and substantially unswollen when treated with an aqueous solution of ammonium hydroxide.

A copolymer (Copolymer B) in latex form, was prepared in a similar manner to that in Example 1 but with the following monomer ratios:

| | Parts |
|---|---|
| Butadiene | 30 |
| Methyl methacrylate | 21 |
| Methacrylic acid | 45 |
| Itaconic acid | 4 |

0.1 part of tertiary dodecyl mercaptan was used as modifier and the polymerisation was taken to substantial completion at 35% solids content.

This copolymer was not appreciably soluble in aqueous ammonium hydroxide solution at pH 9 and above but gave a translucent suspension of jelly-like material.

A blend was prepared by mixing sufficient of the two latices to give 90 parts of copolymer A with 10 parts of copolymer B. The viscosity of this blend did not increase appreciably when the pH was raised to about 6 with aqueous ammonium hydroxide solution.

This blend was used in preparing the following coating mix.

| | Parts dry weight |
|---|---|
| China clay | 100 |
| "Dispex" 115N | 0.3 |
| Latex blend | 7 |

The china clay was dispersed in water in a high speed mixer in the presence of the "Dispex" 115N and to the resultant mix was added the latex blend and the solids content adjusted to 60%. The pH was finally adjusted to 9–10 with ammonia.

The mix so prepared had satisfactory flow and water retention properties for blade coating and the coated paper properties were satisfactory for rotogravure printing. A similar mix based on a latex of copolymer A alone could not be run successfully on a blade coater because the viscosity and water retention properties were too low.

EXAMPLE 3

A copolymer, in latex form (Copolymer B) was prepared by adding the following materials to a stirred autoclave:

| | Parts |
|---|---|
| Water | 170 |
| Syrene | 10 |
| Methacrylic acid | 60 |
| Sodium dodecyl sulphonate | 2 |
| Tertiary dodecyl mercaptan | 0.2 |
| Potassium peroxydisulphate | 0.4 |
| Di-sodium salt of ethylene diamine Tetra-acetic acid | 0.05 |

The autoclave was then purged with nitrogen, sealed, evacuated and 30 parts of butadiene-1,3 fed in.

The dispersion was maintained at 55° C. until substantially all the monomers present had been converted into copolymer giving an acidic latex of about 37% solids content.

A translucent suspension of highly swollen material was formed when an aqueous solution of ammonium hydroxide was added to this acidic latex, raising the pH to 9 or above.

A blend was prepared by mixing 8 parts of this copolymer B with 92 parts of the copolymer A prepared as in Example 1. The viscosity of the blend did not rise appreciably when the pH was raised to about 6 with an aqueous solution of ammonium hydroxide.

This blend was used in preparing the following coating mix.

| | Parts dry weight |
|---|---|
| China clay | 100 |
| "Dispex" 115N | 0.3 |
| Latex blend | 7 |

The china clay was dispersed in water in a high speed mixer in the presence of the "Dispex" 115N and to the resultant mix was added the latex blend and the solids content adjusted to 60%. The pH was finally adjusted to 9–10 with ammonia.

The mix so prepared had satisfactory flow and water retention properties for blade coating and the coated paper properties were satisfactory for rotogravure printing. A similar mix based on a latex of copolymer A alone could not be run successfully on a blade coater because the viscosity and water retention properties were too low.

EXAMPLE 4

A blend was prepared by mixing 95 parts of a copolymer A with 5 parts of a copolymer B. Copolymer A was that prepared in Example 1 and the copolymer B the same as that prepared in Example 3.

This blend was used in preparing the following coating mix.

| | Parts dry weight |
|---|---|
| China clay | 100 |
| "Dispex" 115N (believed to be the sodium salt of a polycarboxylic acid of low molecular weight) | 0.3 |
| Latex blend | 14 |

The china clay was dispersed in water in a high speed mixer in the presence of the "Dispex" 115N, which acts as a dispersing agent for the china clay, and to the resultant mix was added the latex blend and the solids content adjusted to 60%.

After the pH of the mix had been raised to 9–10 by the addition of an aqueous solution of ammonia, the rheological and water retention properties of the mix were suitable for application to paper using a high speed blade coating machine, whereas a similar coating composition prepared using a latex of copolymer A alone was too low in viscosity and water retention properties for application on a blade coater.

When applied to paper using a high speed blade coater, dried and calendered, the paper had satisfactory pick resistance for offset litho printing, and high gloss.

I claim:

1. An aqueous coating composition comprising a blend of a separately prepared latex of a copolymer A and a separately prepared latex of a copolymer B in which blend, of the total weight of copolymer A plus copolymer B, there is from 80–99% by weight of copolymer A and correspondingly from 1–20% by weight of copolymer B, copolymer A being a film-forming polymer that is insoluble and not swellable to any substantial extent in aqueous alkali at pH 10 at 20° C. and being a copolymer of 45–70% by weight of styrene and/or methyl methacrylate, 0–5% by weight of a copolymerizable ethylenically unsaturated carboxylic acid and the remainder butadiene-1,3, and copolymer B being substantially swellable and at least 50% by weight insoluble in aqueous alkali at pH 10 at 20° C. and being a cross-linked copolymer of 10–45% by weight of butadiene-1,3, 5–45% by weight of styrene and/or methyl methacrylate, and 41–65% by weight of a coplymerizable ethylenically unsaturated acid, the cross-linking being sufficient to impart the required insolubility in aqueous alkali but not so great as to hinder the swelling of the copolymer in aqueous alkali.

2. A composition according to claim 1 in which the said copolymer B contains from 10 to 45% by weight of styrene and/or methyl methacrylate.

3. A composition according to claim 2 in which the said copolymer B contains from 41 to 60% of the copolymerisable ethylenically unsaturated acid.

4. A composition according to claim 3 in which the said copolymer B contains from 45 to 50% of the copolymerisable ethylenically unsaturated acid.

5. A compoistion according to claim 1 in which copolymer A contains less than 1% by weight of an emulsifying agent based on the weight of the monomer mixture from which copolymer A is prepared.

6. A composition to claim 1 in which the blend comprises from 88–97% by weight of copolymer A and from 12–3% by weight of copolymer B.

7. An aqueous coating composition according to claim 1 in which there is dispersed a pigment, from 5–25 parts by weight of copolymer A plus copolymer B being present for each 100 parts by weight of the pigment.

8. Permeable substrates whenever coated with a composition according to claim 7.

References Cited

UNITED STATES PATENTS

| | | | |
|---|---|---|---|
| 3,177,173 | 4/1965 | Filter et al. | 260—29.7 |
| 3,256,234 | 6/1966 | Miller | 260—29.7 |
| 3,262,985 | 7/1966 | Müller et al. | 260—80.3 |
| 3,440,184 | 4/1969 | Erickson et al. | 260—2.5 |
| 3,468,833 | 9/1969 | Meincke | 260—29.7 |
| 2,944,044 | 7/1960 | Baer | 260—29.7 W |

FOREIGN PATENTS

| | | | |
|---|---|---|---|
| 959,521 | 6/1964 | Great Britain | 260—29.7 D |

MORRIS LIEBMAN, Primary Examiner

T. DE BENEDICTIS, Sr., Assistant Examiner

U.S. Cl. X.R.

260—29.7 D, UA, H, 80.3, 80.7